United States Patent Office 3,468,993
Patented Sept. 23, 1969

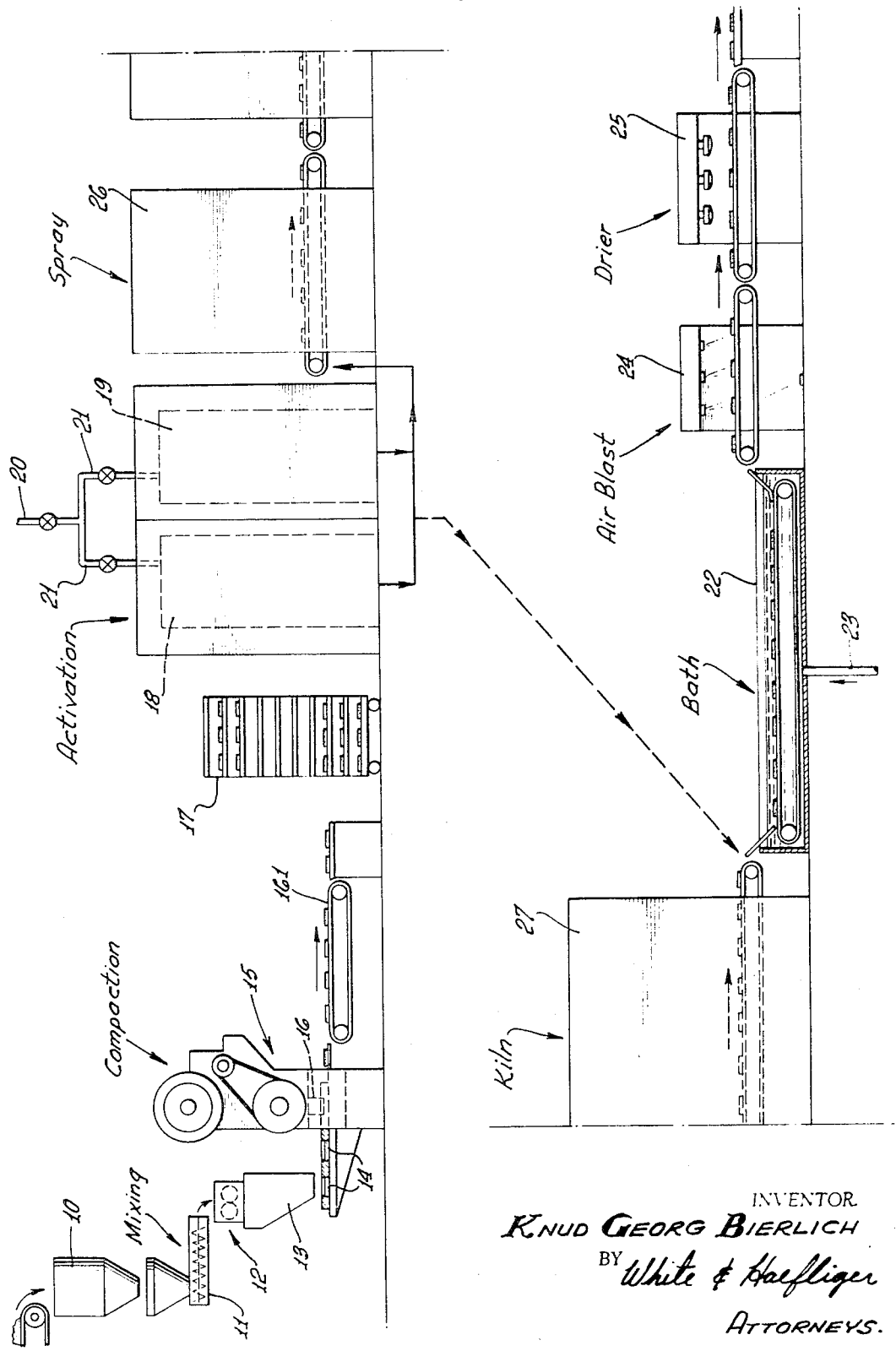

3,468,993
MANUFACTURE OF PORTLAND CEMENT PRODUCTS
Knud Georg Bierlich, Los Angeles, Calif., assignor of thirty percent to Hobert R. Goodrich, Los Angeles, Calif.
Filed Sept. 6, 1966, Ser. No. 577,247
Int. Cl. C04b 15/14
U.S. Cl. 264—82                 17 Claims

ABSTRACT OF THE DISCLOSURE

A method of rapidly pressure-forming easily and immediately handleable objects from portland cement-aggregate mixes which contain a very small amount of added water (in an amount insufficient to fill all voids in the object) and subjecting the pressure-formed objects to the action of an atmosphere at superatmospheric pressure containing added carbon dioxide to produce an exothermic reaction whereby the objects attain a materially higher strength within a period of less than an hour, permitting virtually immediate packing for storage or shipment. The press formed cementitious objects made by the method.

---

This invention has to do with novel advances in the manufacture of portland cement products whereby it is now made possible to rapidly produce preliminarily integrated and hardened products in any of various categories, shapes and sizes, which optionally may be handled, packaged or distributed from the production plant for ultimate curing and hardening, without requiring maintenance of plant inventories usually required for curing.

Products contemplated by the invention have in common the characteristic that they are portland cement-containing products whose composition otherwise may vary in accordance with their particular kinds. Generally contemplated are products in at least two categories, viz., unfired products or those which ultimately acquire their set and hardness under atmospheric conditions, and other products which result from high temperature firing. In terms of starting compositions, all the products may be characterized as mixtures of portland cement and aggregates, which term is intended to be inclusive in a physical sense of particulate solids whose porperties and compositions otherwise may vary in accordance with intended end products. Thus for the making of unfired products the starting mixes may comprise variable proportioning of portland cement with siliceous aggregates such as sands and coarser aggregates, commonly used with portland cements, with or without other materials such as shales, shists, granite, coral, volcanic ash and expandable lightweight aggregates, and in addition various organic materials such as sugar cane wastes, cotton fiber, paper products, etc. For fired products the starting mixes may contain portland cement and selected materials such as kaolin, talc, clay or the like commonly employed in making fired ceramic as well as other materials high in silicates which normally cannot be used in the manufacture of ceramic tiles.

The same mix can be used in pressure-forming objects for fired or unfired products as desired. The unfired precast can then be cured into concrete and stored for months or years and subsequently glazed and fired and then cured into concrete for the second time. Also the moist pressure-formed objects can be placed into an appropriate kiln at e.g. 1800° F. without damage, as contrasted with ceramic tile which must be dehydrated completely before firing.

While applicable, as indicated, to the manufacture of products of various shapes and sizes, the invention will be illustrated as applied to the making of unfired and fired portland cement-containing tile.

The invention is predicated generally upon the employment in novel manner and relationship of three essential steps or stages: (1) initial formation of a compactable mix significantly characterized by low water content, (2) subjecting the mix to high pressure compaction as in the manner later described, and (3) exposing the compact to an atmosphere of carbon dioxide. The invention also contemplates a further step of contacting the compact following its carbon dioxide exposure, with carbonated water, the effect of which is to accelerate curing of the compact and eliminate subsequent calcarious efflorescence, all as will later appear in greater particularity. While some of the occurrences and conditions within and resulting from these stages appear to be explainable, others may not be fully apparent. Accordingly, while certain theories or hypotheses may be stated in an endeavor to account for effects and results achieved, these are not intended to be given in any limitative sense.

Added to the generalities just stated, the invention has for its objects to utilize the recited steps or stages as bases for the production, virtually in a continuous and short time sequence if desired, either of unfired portland cement tile immediately capable of various dispositions during which ultimate curing or hardening occurs, or of fired tile in a manner compatible with production in a continuous sequence time-wise far less than that required for the usual manufacture of ceramic tile.

In more particular reference to the indicated stages, the first involves formation of a uniform portland cement-aggregate mix with insufficient water to fully occupy the void spaces in the uncompressed mixture, thus allowing for subsequent compaction and compressed-state water distribution. For this requirement the water content is kept within the range of about 2% to 10% by weight of the total mix, and most usually the water content will not exceed about 8%. In general the water content of the mix will be proportionate to the aggregate and sand sizing and to the total aggregate and sand water adsorption properties.

The significantly important second stage involves confinement of the low water mix and subjecting it to high pressure compaction under at least several hundred pounds per square inch pressure. Preferably employed are pressures of at least about 500 p.s.i. and ranging as high as 1500 to 2000 p.s.i. or above depending upon such considerations as the requirements for particular products and practicably useable compaction equipment. I have found important benefits to result from impact compression, and preferably repeated impact compression, by subjecting the confined mix to sudden successive impacts by a means capable of exerting e.g. 500 to 2000 p.s.i. impact or effective compaction pressure. One result of the compaction is to accomplish distribution of the water throughout the mass in intimate and reduced particle or film state in keeping with void reductions, so that at least limited hydration and early stage gel formation of the cement start in the environment of compacted intimacies of liquid-solid contact. The hydration thus initiated continues with progressive temperature rise of the compact thereafter. In general the lower the water content of the mix, the higher should be the compression pressure.

In the third stage the compression-integrated uncured pressure-formed object is exposed to an atmosphere of carbon dioxide, preferably under superatmospheric pressure e.g. up to about 60 p.s.i.g. The exposure time may vary, in some instances under one minute, but exposures for periods of from about two to five minutes are generally sufficient, the optimum exposure time varying with both pressure and temperature. I regard the effect of the carbon dioxide exposure as being one in the nature of activation of initial further hardening of the precast. Apparently some degree of reaction between the carbon dioxide and gel or calcium hydroxide in the cement occurs. Whatever the ultimate reactive effects of the carbon dioxide exposure may be, an immediately observable result is a marked strengthening of the pressure-formed object in comparison with the strength of a corresponding object that has not been given carbon dioxide exposure. Thus whereas a given piece not subjected to carbon dioxide treatment may tend to break or crumble relatively easily, the same piece following the carbon dioxide exposure will be found sufficiently integrated to resist breakage to the extent of remaining intact during subsequent handling and processing. The effect of a following dip or contact of the carbon dioxide-treated pressure-formed object with aqueous carbonic acid is a reduction of the tendency of the object to form a whitish deposit, or "efflorescence," commonly seen on concrete surfaces which is the result of leaching and subsequent carbonation and evaporation, and also a significant further hardening of the pressure-formed object to the extent that following surface washing and cleansing it may be handled and even cartoned for inventory or distribution without breakage or distortion. This same conditioning of pressure-formed object formulated for firing, produces a body that may be immediately glazed or otherwise surfaced if desired, and kiln-fired to produce transportable precast. Directly following firing, the body can be immersed without prior cooling, in cold water and the body will withstand the thermal shock, whereas ceramic tile would shatter.

The invention and its practice will be more fully understood from the accompanying drawing which diagrammatically and in flow sheet form depicts illustrative practices of the invention.

Initially a low water content raw mix, typically corresponding to the examples later given and after being given preliminary mixing, may be delivered to hopper 10 from which the mix is fed as by screw conveyor 11 to a supplementary mixer generally indicated at 12 and which may be of any of various types such as a hammer mill or rotary screen acting to loosely agitate and produce uniform blending of the mix components which go to hopper 13. From this hopper the mix is delivered to an individual or series of open top confinement means such as molds 14 for delivery to an impact type pressure generally indicated at 15. This press may be of any known type having for example a plunger or ram 16 corresponding approximately in size and shape to the mold cavity and powered for sudden impact down against the mixture in the mold at high energy capable of delivering to the mold contents an effective impact pressure of at least several hundred pounds and preferably in the 500 to 2000 pound range previously mentioned, although larger pieces may warrant pressures as high as 5000 p.s.i. or above. In practice it is found that the most desirable pressure integration of a mix is achieved by successive, typically three, sudden shock-like impactions by the ram. The compacted material then is removed from the mold and in a state of such physical integration that the resulting "raw" pressure-formed object is capable of being handled or carried by conveyor 161 for placement among accumulated precast in a rack or other holder 17.

As a result of the repetitive shock-like compaction the voids in the loose mix as introduced to the mold, are reduced down to a relatively fine void state as a result of which the mix components are brought into intimate pressurized contact and the low water content of the mix is given corresponding distribution and intimate contact with the solids so that the total constituency of the mix is rendered conducive to initiation of the cement setting which is characerized by starting of gel formation apparently resulting from hydration of free lime in the cement. As evidence of starting and continuing exothermic gel formation, progressive temperature increase of the compacted pressure-formed body is noted to continue from compaction through the later described carbon dioxide exposure.

Such exposure may be accomplished in any of various possible kinds of equipment. As illustrative, I may use a pair of chambers 18 and 19 capable of receiving and enclosing racks as indicated at 17. For carbon dioxide activation, successive loaded racks may be alternately put into and removed from the chambers to maintain continuity in the process, with the pressure-formed objects in each chamber being given an exposure over periods ranging from say two to five minutes, to carbon dioxide introduced from line 20 through branches 21 leading to the respective chambers wherein the exposure occurs at superatmospheric pressure, e.g. up to about 60 pounds per square inch gage. In alternating the chamber dioxide usage, after the pressure-formed objects have been exposed to carbon in one, and a second rack is loaded into the other chamber which is then closed, carbon dioxide may be released from the first into the second chamber, thus to economize the gas consumption.

As previously mentioned, the carbon dioxide exposure significantly increases the strength of the pressure-formed objects apparently not only by surface effect but also by deep penetration carbonation that is productive of strengthening the integration and dimensional stability of the objects.

For the production of unfired pre-casts, the latter following carbon dioxide activation may be introduced into an extended water bath 22 within which the precasts are submerged and advanced through the bath during a period that may range from about 2 to 10 minutes. It is found that water curing of the pressure-formed and treated objects is favored by the introduction suitably to the bath, as diagrammatically indicated by line 23, of carbon dioxide so that each precast is subjected to the effects of dilute aqueous solution of the gas. During the immersion, gas bubbles release from the pressure-formed and $CO_2$ treated objects, indicative of effects that may be responsible for arresting of tendencies subsequently of the pieces to develop surface efflorescence. Such calcareous accumulations as may appear on the surface of the objects during or as a result of the bath immersion may be removed by water wash.

Following removal from the bath and surface cleansing the objects may be allowed to continue their curing in a wet state, or surface moisture may be removed as by passing the precasts on conveyor 23 through an air air blast chamber 24 followed by a heated dried chamber 25. After surface moisture removal the precasts may be given any suitable disposition either for retention at the plant or for distribution elsewhere, under any of which eventualities the treated objects continue to gain strength to the ultimate hardness afforded by the portland cement content. As illustrative, and demonsrative of the early strength acquired by the precasts by the time of surface moisture removal, they may be immediately packaged as by placement within cartons, and distributed to usage locations while the precasts continue progressive hardening.

The entire sequence of operations as described may be accomplished in surprisingly short time and may require no more than a time period of from about 20 to 30 minutes.

In the alternate practice of the invention for the manufacture of fired portland cement products, assuming a properly composed starting mix, the sequence of operations through carbon dioxide activation is the same as I have described. Thereafter the procedure differs in that following removal from the activation chamber the precast (if it is to be glazed) is passed through a spray booth 26 and coated with appropriate liquid glaze, and thence is passed continuously through a heating chamber 27 such as a conventional tile firing kiln wherein during a period of from say about 30 to 45 minutes (including preheat, firing and cooling) the precast is exposed to a high temperature kiln atmosphere which normally may be in the range of about 1000 to 1800° F. Upon removal from the kiln the precast is suitably cured as by water contact or immersion, for which purpose I may employ the previously described water emersion and drier stages kiln 22, 24 and 25, as where a single plant is adapted to the production of either the fired or unfired precast. Compositions such as Example VI below, when fired within the stated temperature range become a relatively low strength bisque, having however sufficient strength for handling. The bisque may be given accelerated (carbonated water) curing upon removal from the kiln or at any time later, or the precast may be allowed prolonged cure by atmospheric moisture for conversion to concrete.

UNFIRED PRODUCTS

Example I

Floor paving:
- 500 lbs. portland cement
- 300 lbs. silica sand, 60 mesh
- 200 lbs. silica sand, 30 mesh (graduation thereof)
- 3% water at 60° F. mix temperature Compaction: three ram strokes at 2500 p.s.i.
$CO_2$ exposure: 40 seconds at 70 p.s.i.g.

Example II

Floor paving:
- 500 lbs. portland cement
- 500 lbs. shist (shale, granite, etc.)

| Graduation, percent | Mesh |
|---|---|
| 100 | 30 |
| 99 | 50 |
| 92 | 100 |
| 56.6 | 100 |

- 5% water at 80° F. mix temperature

Compaction: three ram strokes at 1500 p.s.i.
$CO_2$ exposure: 1 minute at 60 p.s.i.g.

Example III

Wall panel:
- 200 lbs. portland cement
- 500 lbs. silica sand; 60 mesh
- 300 lbs. silica sand, 30 mesh (graduation thereof)
- 6% water at 100° F. mix temperature Compaction: three ram strokes at 2500 p.s.i.
$CO_2$ exposure: 3 minutes at 60 p.s.i.g.

Example IV

Wall panel:
- 500 lbs. portland cement
- 300 lbs. shist (shale) same graduation as #2
- 200 lbs. silica sand, 60 mesh
- 6% water at 80° F. mix temperature Compaction: three ram strokes at 1000 p.s.i.
$CO_2$ exposure: 2 minutes at 60 p.s.i.g.

Example V

Roofing tile:
- 200 lbs. portland cement
- 800 lbs. silica sand
- 2% water

Silica sand graduation:
- Passing #4 standard sieve, 100%
- Passing #8 standard sieve, 95–100%
- Passing #16 standard sieve, 70–85%
- Passing #30 standard sieve, 40–55%
- Passing #50 standard sieve, 10–25%
- Passing #100 standard sieve, 3–9%

Compaction: three ram strokes at 1000 p.s.i.
$CO_2$ exposure: 4 minutes at 60 p.s.i.g.

FIRED PRECAST TILE

Example VI

- 500 lbs. portland cement or white portland cement
- 300 lbs. silica sand, #60 mesh
- 200 lbs. kaolin or talc or clay or shist
- 5% water Compaction: three strokes at 1500 p.s.i.
Exposure to $CO_2$ at 60 p.s.i.g., 4 minutes
Firing of tile (glazed) 1800° F. for 10 minutes

I claim:
1. The method of rapidly making a formed cementitious object that includes forming a compactable mixture of portland cement, solid aggregate and water in an amount about 10% by weight insufficient to fill void spaces between the cement and aggregate, subjecting said mixture to high pressure compaction which uniformly wets the mixture and is productive of initial self-supporting integration of the mixture to produce a pressure-formed object whose body is undergoing early stage hydration and gel formation, exposing the resulting body to an atmosphere of carbon dioxide at superatmospheric pressure to produce an exothermic hardening reaction and a material increase in early strength, relieving the pressure in the chamber and removing the treated pressure-formed objects therefrom, said treated pressure-formed object exhibiting dimensional stability and being capable of developing further and higher strength under normal air and temperature conditions.

2. The method of claim 1, in which formation of said compactable mixture, subjection of the mixture to said compaction and exposure of the pressure-formed object to carbon dioxide occur and are completed sequentially within a period of 30 minutes.

3. The method of claim 1, in which said compaction is effected by sudden high pressure impact against the mixture in a confined state.

4. The method of claim 3, in which the mixture is subjected to successive impacts by a member delivering to the mixture pressure of at least about 500 pounds per square inch to produce small voids uniformly distributed throughout the body of the pressure-formed object.

5. The method of claim 1, in which the water content of said mixture is within the range of about 2% to 10% by weight.

6. The method of claim 5, in which the exposure of the pressure-formed object to carbon dioxide is between about 2 to 5 minutes.

7. The method of claim 6, in which the water content of said mixture is within the range of about 2% to 10% by weight, and in which said mixture is subjected to successive impacts by a member delivering to the mixture pressure of at least about 500 pounds per square inch.

8. The method of claim 7, in which formation of said compactable mixture, subjection of the mixture to said compaction and exposure of the pressure-formed object to carbon dioxide occur and are completed sequentially within a period of 30 minutes.

9. The method of claim 7, in which said pressure-formed object progressively increases in temperature by hydration following said compaction and exposure to carbon dioxide, and the treated pressure-formed object is contacted by an aqueous coolant following said exposure to carbon dioxide.

10. The method of claim 8, in which said coolant is a carbonated aqueous bath in which the body is immersed.

11. The method of claim 9, in which carbon dioxide is fed into said bath.

12. The method of claim 1, in which following exposure to carbon dioxide the treated pressure-formed object is contacted by liquid coolant and is packaged for the development of further strength, within the package.

13. The method of claim 1, wherein the pressure-formed object, following exposure to carbon dioxide, is fired in a kiln.

14. The method of claim 13, in which a glaze is applied to the treated pressure-formed object before firing.

15. The method of claim 13, in which the fired object is passed through an aqueous bath.

16. The method of claim 15, in which carbon dioxide is fed into the bath.

17. A method of making, within a period of 30 minutes, pressure-formed, dimensionally stable objects which can be handled and cartoned without breakage, consisting essentially of:

pressure-forming a moist portland cement-aggregate mixture containing about 10% water by weight to fill interstitial voids by subjecting such moist mixture to at least several hundred pounds per square inch pressure in a mold;

placing said pressure-formed object in a sealed chamber and exposing such object to an atmosphere of carbon dioxide at superatmospheric pressure to produce an exothermic hardening reaction;

relieving the pressure in the chamber and removing the treated pressure-formed objects therefrom.

References Cited
UNITED STATES PATENTS

| | | | |
|---|---|---|---|
| 2,496,895 | 2/1950 | Staley. | |
| 3,238,279 | 3/1966 | Tarlton et al. | 264—82 |
| 3,268,637 | 8/1966 | Cremer | 264—58 |
| 3,306,961 | 2/1967 | Spence | 264—82 |
| 3,358,342 | 12/1967 | Spence | 264—82 |

JULIUS FROME, Primary Examiner

T. MORRIS, Assistant Examiner

U.S. Cl. X.R.

264—333